(12) United States Patent
Murakami et al.

(10) Patent No.: US 9,442,233 B2
(45) Date of Patent: Sep. 13, 2016

(54) ANTI-REFLECTION CIRCULARLY POLARIZING PLATE FOR ORGANIC EL DISPLAY AND ORGANIC EL DISPLAY

(75) Inventors: Nao Murakami, Ibaraki (JP); Takashi Shimizu, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

(21) Appl. No.: 13/991,478

(22) PCT Filed: Dec. 6, 2011

(86) PCT No.: PCT/JP2011/078149
§ 371 (c)(1),
(2), (4) Date: Jun. 4, 2013

(87) PCT Pub. No.: WO2012/077663
PCT Pub. Date: Jun. 14, 2012

(65) Prior Publication Data
US 2013/0249378 A1    Sep. 26, 2013

(30) Foreign Application Priority Data
Dec. 6, 2010 (JP) .................. 2010-271860

(51) Int. Cl.
*H01J 5/16* (2006.01)
*H01J 61/40* (2006.01)
(Continued)

(52) U.S. Cl.
CPC .............. *G02B 5/3025* (2013.01); *C08J 5/18* (2013.01); *G02B 5/3083* (2013.01); *G02B 27/286* (2013.01); *G02B 1/11* (2013.01)

(58) Field of Classification Search
CPC ...... C08J 5/18; G02B 5/3083; G02B 27/286; G02B 5/3025; G02B 1/11
USPC ............ 313/112, 504, 512, 110; 359/488.01; 349/96; 362/19
See application file for complete search history.

(56) References Cited

U.S. PATENT DOCUMENTS 7,643,118 B2    1/2010 Nagase et al.
7,807,239 B2 * 10/2010 Konishi .................. C08F 24/00
                                                              349/117

(Continued)

FOREIGN PATENT DOCUMENTS

| CN | 100587526 | 2/2010 |
| JP | 2002071949 A | 3/2002 |

(Continued)

OTHER PUBLICATIONS

Taiwanese Office Action for application No. 100144860 dated Dec. 23, 2013.

(Continued)

*Primary Examiner* — Elmito Breval
*Assistant Examiner* — Glenn Zimmerman
(74) *Attorney, Agent, or Firm* — Hauptman Ham, LLP

(57) ABSTRACT

A retardation film which comprises a stretched polymer film and satisfies the following formulae (1) to (3):

$$0.70 < Re[450]/Re[550] < 0.97 \quad (1);$$

$$1.5 \times 10^{-3} < \Delta n < 6 \times 10^{-3} \quad (2);$$

and $$1.13 < NZ < 1.50 \quad (3),$$

wherein: Re[450] and Re[550] represent in-plane retardation values of the retardation film as measured at 23° C. using light with a wavelength of 450 nm and light with a wavelength of 550 nm, respectively; $\Delta n$ represents an in-plane birefringence equal to (nx−ny) (where nx and ny represent refractive indexes in a slow axis direction and a fast axis direction of the retardation film, respectively); and NZ represents a ratio of a thickness-direction birefringence equal to (nx−nz) (where nz represents a refractive index in a thickness direction of the retardation film) to the in-plane birefringence equal to (nx−ny).

4 Claims, 3 Drawing Sheets

(51) Int. Cl.
*G02B 5/30* (2006.01)
*C08J 5/18* (2006.01)
*G02B 27/28* (2006.01)
*G02B 1/11* (2015.01)

(56) References Cited

U.S. PATENT DOCUMENTS

| | | | |
|---|---|---|---|
| 2006/0113904 A1* | 6/2006 | Bae et al. | 313/506 |
| 2006/0177607 A1* | 8/2006 | Ohmori et al. | 428/1.31 |
| 2008/0192192 A1* | 8/2008 | Toyama | G02B 5/305 349/117 |
| 2008/0204644 A1 | 8/2008 | Toyama et al. | |
| 2009/0103016 A1* | 4/2009 | Shutou | G02B 5/3033 349/96 |
| 2009/0109385 A1 | 4/2009 | Nagase et al. | |
| 2009/0116109 A1* | 5/2009 | Konishi et al. | 359/500 |
| 2009/0128759 A1* | 5/2009 | Yoshimi et al. | 349/118 |
| 2010/0182550 A1* | 7/2010 | Maezawa | G02F 1/133371 349/107 |
| 2011/0288261 A1 | 11/2011 | Motoyoshi et al. | |
| 2012/0120356 A1 | 5/2012 | Washizu et al. | |
| 2013/0005939 A1 | 1/2013 | Motoyoshi et al. | |

FOREIGN PATENT DOCUMENTS

| | | |
|---|---|---|
| JP | 2003215337 A | 7/2003 |
| JP | 2004134306 A | 4/2004 |
| JP | 2004136613 A | 5/2004 |
| JP | 2006171235 A | 6/2006 |
| JP | 3984277 | 6/2007 |
| JP | 2007161994 | 6/2007 |
| JP | 2008009389 A | 1/2008 |
| JP | 2008-070742 A | 3/2008 |
| JP | 2008102498 | 5/2008 |
| JP | 2009063983 | 3/2009 |
| TW | 200829631 A | 7/2008 |
| TW | 200946570 A | 11/2009 |
| TW | 201028773 A | 8/2010 |
| WO | 2008-034716 A1 | 3/2008 |
| WO | WO 2008084610 A1 * | 7/2008 |
| WO | 2010064721 | 6/2010 |
| WO | WO 2010071079 A1 * | 6/2010 |

OTHER PUBLICATIONS

Japanese Office Action for application 2012-547864 dated Apr. 23, 2014.

International Search Report mailed Jan. 24, 2012 for PCT/JP2011/078149.

Chinese Office Action for application 201180058702.X dated Sep. 19, 2014.

Japanese Office Action for application 2012-547864 dated Nov. 25, 2014.

Japanese Office Action for application No. 2014-128513 dated Oct. 13, 2015.

* cited by examiner

ANTI-REFLECTION CIRCULARLY POLARIZING PLATE FOR ORGANIC EL DISPLAY AND ORGANIC EL DISPLAY

CROSS REFERENCE TO RELATED APPLICATION

This application claims the priority of Japanese Patent Application No. 2010-271860, filed on Dec. 6, 2010 in the JIPO (Japanese Intellectual Property Office). Further, this application is the National Phase application of International Application No. PCT/JP2011/078149 filed Dec. 6, 2011, which designates the United States and was published in Japanese.

TECHNICAL FIELD

The present invention relates to a retardation film comprising a stretched polymer film.

BACKGROUND ART

Late years, along with popularization of displays, a function required for an optical film for use therein has become increasingly diversified. Therefore, there is a need for film developments based on a new material and a new process.

Apart from film capabilities, in order to cope with size enlargement/thickness reduction of a display and an increase in production volume of displays, it is required to produce a large-width and thin film in large numbers. In production of such a thin-layer film, film strength is a key design parameter, in terms of runnability, processability and product reliability.

With regard to runnability, it is usual to roll-convey a film under a contact with various rolls, so as to continuously produce a long film for large-scale production. This involves a problem that, when folding or crinkling occurs in the film, a force is applied in a width direction thereof, which is likely to cause the film to tear in a longitudinal direction thereof. On the other hand, if the film is excessively largely bent during conveyance along a roll, the film is likely to tear in the width direction. Further, after slitting an end face of the film, or when an impact force is applied to the end face, the film is also likely to tear in the width direction. As above, in order to allow a film to run in a stable manner, it is necessary to ensure sufficient film strength in both longitudinal and width direction thereof.

With regard to film processability, poor film strength leads to a problem that breaking, such as tearing, is likely to occur in a film due to, for example, force during an operation of cutting the film into a sheet shapes, bending during an operation of laminating the film to another film or a panel, or bending during an operation of reworking the film from a panel.

With regard to product reliability, under a high-temperature and high-humidity environment, or under conditions of rapid change in temperature and/or humidity, a crack is likely to occur in a film due to failure in following shrinkage and/or expansion of a polarizer or other laminated films, causing non-uniformity of image display.

For this reason, it is necessary to improve film brittleness in terms of runnability, processability and product reliability in order to produce a large-width and thin film in large numbers.

In particular, when mention is made of an organic EL display, a circularly polarizing plate having a λ/4 retardation plate is employed in the organic EL display, for an anti-reflection purpose. Further, a reverse wavelength dispersion-type retardation plate is required to neutralize a reflection color. In order to cope with a larger type having potential to become popular in future, while fulfilling high image quality and small thickness as features of the organic EL display, it is necessary to provide a reverse wavelength dispersion-type thinned λ/4 retardation platewhich is large in width. With a view to imparting a reverse dispersion property, for example, to a copolymer, if a weight ratio between a main chain and a side chain is adjusted in such a manner as to increase the ratio of the side chain, a film is liable to become brittle. Consequently, the film has poor stretchability, causing difficulty in conducting design for thickness reduction and/or size enlargement.

A retardation film is known as one of the optical films. As one example of the retardation film, there has been developed a type having a property that a retardation value becomes larger as measured using light with a longer wavelength (also referred to as "reverse wavelength dispersion property"), as disclosed, for example, in the following Patent Documents 1 and 2. However, in the Patent Documents 1 and 2, no discussion about improvement in the above film brittleness is made.

LIST OF PRIOR ART DOCUMENTS

Patent Documents

Patent Document 1: JP 3984277 B2
Patent Document 2: WO 2010/064721 A1

SUMMARY OF THE INVENTION

Technical Problem

The present invention has been made to solve the above problems, and an object thereof is to provide a retardation film excellent in runnability, processability and product reliability. The present invention has been made based on a founding that strength such as folding endurance of a stretched polymer film constituting a retardation film can be evaluated by utilizing values indicative of optical properties of the retardation film.

Solution to the Technical Problem

As a result of diligent studies for solving the above problems, the inventors of this application found that the above object can be achieved by the following retardation film, and have finally accomplished the present invention.

The present invention provides a retardation film which comprises a stretched polymer film and satisfies the following formulae (1) to (3):

$$0.70 < Re[450]/Re[550] < 0.97 \quad (1);$$

$$1.5 \times 10^{-3} < \Delta n < 6 \times 10^{-3} \quad (2); \text{ and}$$

$$1.13 < NZ < 1.50 \quad (3),$$

wherein: Re[450] and Re[550] represent in-plane retardation values of the retardation film as measured at 23° C. using light with a wavelength of 450 nm and light with a wavelength of 550 nm, respectively; $\Delta n$ represents an in-plane birefringence equal to (nx−ny) (where nx and ny represent refractive indexes in a slow axis direction and a fast axis direction of the retardation film, respectively); and NZ represents a ratio of a thickness-direction birefringence equal to (nx−nz) (where nz represents a refractive index in a thickness direction of the retardation film) to the in-plane birefringence equal to (nx−ny).

In one preferred embodiment, an absolute value (m²/N) of a photoelastic coefficient as measured at 23° C. using light with a wavelength of 550 nm is $50\times10^{-12}$ or less.

In another preferred embodiment, an absolute value (m²/N) of a photoelastic coefficient as measured at 23° C. using light with a wavelength of 550 nm is in a range of $10\times10^{-12}$ to $45\times10^{-12}$.

In yet another preferred embodiment, the polymer film composed, for example, of a copolymer, is made of an aliphatic polymer, and comprises a primary component consisting of a high molecular weight complex which comprises a main chain having a stretch-orientation property and, in a side chain, a unit having an absorption edge at a wavelength of 260 to 380 nm, wherein a plane of the side chain intersects with a direction along which the main chain extends.

According to another aspect of the present invention, there is provided a polarizing plate. This polarizing plate comprises a polarizer and the above retardation film.

In one preferred embodiment, the polarizing plate is a circularly polarizing plate.

According to yet another aspect of the present invention, there is provided a display panel device. This display panel device comprises the above polarizing plate.

Effect of the Invention

The retardation film of the present invention satisfies the following formulae (1) to (3):

$$0.70 < Re[450]/Re[550] < 0.97 \quad (1);$$

$$1.5\times10^{-3} < \Delta n < 6\times10 \quad (2);$$

and $$1.13 < NZ < 1.50 \quad (3)$$

(wherein: Re[450] and Re[550] represent in-plane retardation values of the retardation film as measured at 23° C. using light with a wavelength of 450 nm and light with a wavelength of 550 nm, respectively; Δn represents an in-plane birefringence equal to (nx−ny) (where nx and ny represent refractive indexes in a slow axis direction and a fast axis direction of the retardation film, respectively); and NZ represents a ratio of a thickness-direction birefringence equal to (nx−nz) (nz represents a refractive index in a thickness direction of the retardation film) to the in-plane birefringence equal to (nx−ny), so that it exhibits a reverse wavelength dispersion property, while ensuring excellent runnability, processability and product reliability. The retardation film having the above properties is significantly useful in improvement in production efficiency of a retardation film and display properties of a display panel device.

DESCRIPTION OF EMBODIMENTS

<1. Retardation Film>

Figure 1:
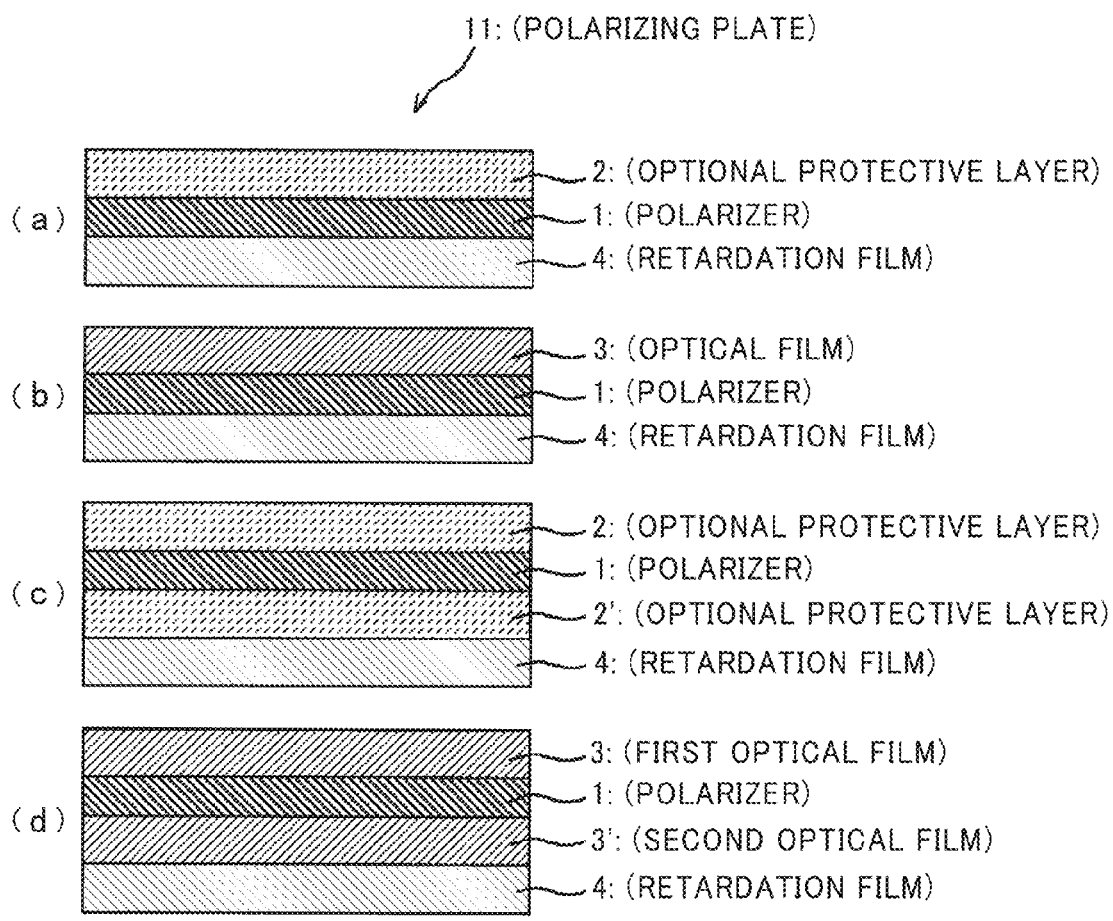
FIG. 1 is a schematic sectional view of a polarizing plate using a retardation film, according to a preferred embodiment of the present invention.

A retardation film of the present invention is a film to be obtained by stretching a polymer film. As used in this specification, the term "retardation film" means a film having a birefringence in an in-plane and/or thickness directions thereof.

As used in this specification, "Re[550]" represents an in-plane retardation value as measured at 23° C. using light with a wavelength of 550 nm Re[550] can be obtained by the following formula: Re[550]=(nx−ny)×d, where: nx and ny represent respective refractive indexes at a wavelength of 550 nm in a slow axis direction and a fast axis direction of the retardation film; and d (nm) is a thickness of the retardation film. Further, the term "slow axis" here means a direction providing a maximum in-plane refractive index.

The in-plane birefringence Δn equal to (nx−ny) is set preferably in the range of $1.5\times10^{-3}$ to $6\times10^{-3}$, more preferably in the range of $1.5\times10^{-3}$ to $5\times10^{-3}$, further more preferably in the range of $2.0\times10^{-3}$ to $4.5\times10^{-3}$. For example, in the case where the retardation film is used as a λ/4 plate, the Δn is preferably set to $3.5\times10^{-3}$. Production of a retardation film which is larger in width than before become possible to cope with large-screen displays, and facilitate effective material utilization to allow low-cost design by making a stretching process in production of the retardation film include fixed-end stretching, such as transverse stretching or oblique stretching, and adjusting a stretching ratio, a stretching temperature, a stretching speed, etc., in the stretching to allow the Δn to fall within the above range. Depending on circumstances, with a view to facilitating the adjustment of the Δn based on stretching, film-forming conditions, such as temperature, speed and/or thickness, can be appropriately changed. If the Δn does not fall within the above range, retardation-causing capability will be deteriorated, and large-width stretching cannot be performed. In contrast, when the Δn falls within the above range, it becomes easier to adjust a film to have an appropriate retardation, which makes it possible to perform retardation design according to an intended display to thereby provide a display excellent in normal and oblique viewing angle properties. Further, when the Δn falls within the above range, it becomes easier to design a thickness of a retardation film to become significantly small, and incorporate the retardation film into a thinned display. On the other hand, if the Δn is less than the above range, it becomes necessary to excessively increase the film thickness.

Preferably, the above retardation film has a property that an in-plane retardation value as measured at 23° C. using light with a wavelength of 550 nm (Re[550]) is greater than an in-plane retardation value as measured at 23° C. using light with a wavelength of 450 nm (Re[450]). If the ratio falls within such range, the retardation film having such wavelength dispersion property, causes a larger retardation as the wavelength becomes longer, so that an ideal retardation property can be obtained at each wavelength in the visible region. For example, when used in an organic EL display, a retardation film having such wavelength dependence can be prepared and then laminated to a polarizing plate to produce a polarizing plate such as a circularly polarizing plate, so that it becomes possible to realize a neutral polarizing plate and display having low dependence of hue on wavelength. On the other hand, if the ratio does not fall within such range, the dependency of hue of reflected light on wavelength becomes larger, so that a coloring problem occurs in a polarizing plate and a display. Further, when used in a liquid crystal display, it is possible to improve a phenomenon that light leakage occurs when viewed from different angles, or a phenomenon that a display image becomes bluish (also referred to as "bluish phenomenon").

The ratio (Re[450]/Re[550]) of Re[450] to Re[550] of the above retardation film is set preferably to less than 1, more preferably in the range of 0.50 to 0.99, particularly preferably in the range of 0.70 to 0.97, most preferably in the range of 0.75 to 0.95. The setting of the ratio Re[450]/Re[550] within the above range makes it possible to obtain further excellent display properties when the retardation film is used, for example, in a display panel device.

Preferably, the above retardation film has a property that an in-plane retardation value as measured at 23° C. using light with a wavelength of 550 nm (Re[550]) is less than an in-plane retardation value as measured at 23° C. using light with a wavelength of 650 nm (Re[650]). In the retardation film having such wavelength dispersion property, the retardation value becomes constant in a red region. Thus, when used in a liquid crystal display, it is possible to improve the phenomenon that light leakage occurs when viewed from different angles, or the phenomenon that a display image becomes bluish (also referred to as "bluish phenomenon").

A ratio (Re[650]/Re[550]) of Re[650] to Re[550] of the above retardation film is set preferably to greater than 1, more preferably in the range of 1.01 to 1.20, particularly preferably in the range of 1.02 to 1.15. The setting of the ratio Re[650]/Re[550] within the above range makes it possible to obtain further excellent display properties when the retardation film is used, for example, in an organic EL display.

As used in this specification, "Rth" represents a retardation value in the thickness direction, and can be obtained by the following formula: Rth=(nx−nz)×d, where: nx and nz represent refractive indexes in the slow axis direction and the thickness direction of the retardation film, respectively; and d (nm) is the thickness of the retardation film. The "slow axis" means a direction providing a maximum in-plane refractive index.

With regard to the Rth, a suitable value may be appropriately selected. The Rth is set to 10 nm or more, preferably in the range of 50 nm to 500 nm. For example, in the case where the retardation film is used as a λ/2 plate, the Rth is set preferably in the range of 200 nm to 400 nm, more preferably in the range of 250 nm to 290 nm. On the other hand, in the case where the retardation film is used as a λ/4 plate, the Rth is set preferably in the range of 100 nm to 200 nm, more preferably in the range of 130 nm to 150 nm.

The Re[450], Re[550] and Re[650] can be measured by "AxoScan" (trade name; produced by Axometrics, Inc.).

As used in this specification, "NZ" (also referred to as "Nz coefficient") represents a ratio of a thickness-direction birefringence equal to (nx−nz) to the in-plane birefringence equal to (nx−ny).

The NZ of the retardation film of the present invention is set in the range of 1.13 to 1.50, preferably in the range of 1.14 to 1.40. Significant improvement of folding endurance (flexibility) of the retardation film become possible by making a stretching process in production of the retardation film include fixed-end stretching, such as transverse stretching or oblique stretching, and adjusting a stretching ratio, a stretching temperature, a stretching speed, etc., in the stretching to allow the NZ to fall within the above rang. Depending on circumstances, with a view to facilitating the adjustment of the NZ based on stretching, film-forming conditions, such as temperature, speed and/or thickness, can be appropriately changed.

For example, generally, in longitudinal stretching, when a film is stretched in a longitudinal direction thereof, widthwise shrinkage occurs, because it is not fixed in a width direction thereof. Therefore, molecules will be oriented more in a uniaxial direction, and the refractive indexes nx, ny, nz have, for example, the following relationship: nx>ny=nz. In this case, folding endurance in the longitudinal direction of the film corresponding to a stretching direction, is increased, whereas folding endurance in the width direction of the film is significantly reduced. In order to solve this situation, under a condition that a force of restricting a width dimension of a film is generated in an angular direction intersecting with a stretching direction (for example, in transverse uniaxial stretching, under a condition that a force for allowing a length of a film in its longitudinal direction which is perpendicular to a width direction of the film corresponding to a stretching direction to be maintained constant is generated), the film is subjected to stretching, so that molecules can be oriented in not only the stretching direction but also the angular direction intersecting with the stretching direction, and the refractive indexes nx, ny, nz can be set to have the following relationship: nx>ny>nz. This makes it possible to achieve folding endurances both in the stretching direction and folding endurance in the width direction, at a high level.

A transmittance of the retardation film is set preferably to 80% or more, more preferably to 85% or more, particularly preferably to 90% or more.

An absolute value; C ($m^2$/N) of a photoelastic coefficient of the retardation film at 23° C. is set to $50 \times 10^{-12}$ or less. This makes it possible to prevent a change in retardation value which would be caused by a force applied to the retardation film due to shrinkage stress of a polarizer, heat of a display panel and surrounding environment (humidity resistance and thermal resistance), thereby obtaining a display panel device having good display uniformity. The C of the retardation film is set preferably in the range of $10 \times 10^{-12}$ to $45 \times 10^{-12}$, particularly preferably in the range of $3 \times 10^{-12}$ to $40 \times 10^{-12}$. The setting of the C within the above range makes it possible to reduce a change or variation in retardation value which would occur when a force is applied to the retardation film. The photoelastic coefficient is likely to have a trade-off relation with the Δn. However, as long as the photoelastic coefficient is set to fall within the above range, a display quality level can be maintained without deterioration in retardation-causing capability.

<2. Retardation Film Production Method>

A retardation film according to one embodiment of the present invention is prepared by orientating a polymer film through stratching.

As a technique of stretching the above polymer film, any suitable stretching method may be employed depending on the purpose. For example, the stretching method suitable for the present invention includes a transverse uniaxial stretching method, a longitudinal and transverse simultaneous biaxial stretching method, and a longitudinal and transverse sequential biaxial stretching method. As a stretching device, a suitable any stretching machine, such as a tenter-type stretching machine or a biaxial stretching machine, may be employed. Preferably, the above stretching machine is equipped with a temperature control means. When stretching is performed under heating, an internal temperature of the stretching machine may be continuously changed, or may be non-continuously changed. A stretching process may be a single process or may be divided into two or more sub-processes. With regard to a stretching direction, it is desirable to perform stretching in the width direction (TD direction) of the film or an oblique direction with respect thereto.

With regard to a temperature at which the polymer film is stretched (stretching temperature), a suitable value may be appropriately selected, depending on the purpose. Preferably, the stretching is performed at a temperature of (Tg−20)° C. to (Tg+30)° C. (where Tg represents a glass transition temperature of the polymer film). When this condition is selected, the retardation value is more likely to become uniform, and the film is less likely to be crystallized (become clouded). More specifically, the stretching temperature is set in the range of 90° C. to 210° C., more preferably in the range of 100° C. to 200° C., particularly preferably in the range of 100° C. to 180° C. The glass transition temperature may be determined by a DSC method according to JIS K 7121 (1987).

As a device for controlling the stretching temperature, any suitable device may be employed. For example, the temperature control device includes: an air circulation type constant-temperature oven in which hot air or cool air is circulated; a heater using microwave or far infrared ray; and a roller, heat-pipe roller, metal belt or the like heated for temperature adjustment.

With regard to a ratio at which the polymer film is stretched (stretching ratio), a suitable value may be appropriately selected, depending on the purpose. Preferably, the stretching ratio is set in the range of greater than 1 time to 6 times, more preferably in the range of greater than 1.5 times to 4 times, particularly preferably in the range of greater than 2.0 times to 3 times. While a feed speed during stretching is not particularly limited, it is set preferably in the range of 0.5 m/min to 30 m/min, more preferably in the range of 1 m/min to 20 m/min, in view of machine accuracy, stability and others. The above stretching conditions make it possible to obtain intended optical properties and further obtain a retardation film excellent in optical uniformity.

<3. Use of Retardation Film>

The retardation film of the present invention may be used for any suitable use. A typical use includes a λ/4 plate, a λ/2 plate, and an optical compensation film for a liquid crystal display. A remaining use includes an anti-reflection film for flat panel displays such as a liquid crystal display, an organic EL display, and a plasma display.

<4. Polymer Film to be Used for Retardation Film>

As the retardation film of the present invention, a stretched film of a polymer film comprising a primary component consisting of a thermoplastic resin is used. It is preferable to use a stretched film of a polymer film which is made of an aliphatic polymer composed of a copolymer, and comprises a primary component consisting of a high molecular weight complex which comprises a main chain having a stretch-orientation property and, in a side chain, a unit having an absorption edge at a wavelength of 260 to 380 nm, wherein a plane of the side chain intersects with a direction along which the main chain extends. It is more preferable to use a stretched film of a polymer film comprising a primary component consisting of a high molecular weight complex which comprises a segment introduced to construct a long rigid cyclic structure or crystalline structure in a main chain direction, and, in a side chain, an aromatic group having an absorption edge wavelength of 260 nm to 380 nm, wherein the polymer film is made of a resin, such as a cellulose-based resin, a polyester-based, polyvinyl alcohol-based, polyvinyl acetal-based, polycarbonate-base, polyamide-based, polyimide-based, polyether sulfone-based, polyether-based, polysulfone-based, polystyrene-based, polynorbornene-based, polyolefin-based, acrylic-based, urethane-based, acrylic urethane-based or acetate-based transparent resin. In this high molecular weight complex, the segment and the aromatic group may be in a copolymerized state, or may be in a blended state.

In order to allow the polymer film to have the reverse wavelength dispersion property represented by the formula (1) in the appended claim 1, a unit for causing a steep change in wavelength dispersion may be introduced as a side chain. For this purpose, at least one aromatic group may be introduced as a side chain. If a wavelength of an absorption edge is greater than 380 nm, the absorption edge enters into the visible region, causing a problem of coloring, etc. On the other hand, if the absorption edge is set on a short wavelength side with respect to 260 nm, dispersion by a side chain comes close to flat dispersion, so that the wavelength dispersion property of the high molecular weight complex becomes gentle. Therefor, it is considered that dependence of birefringence in the side chain on wavelength becomes steep without the occurrence of a problem of coloring, etc., and the high molecular weight complex efficiently exhibits the reverse wavelength dispersion property as a whole if a side chain has an aromatic group whose absorption edge wavelength is in the range of 260 to 380 nm.

Meanwhile, a photoelastic coefficient generally depends on an aromatic character of a material structure. Specifically, it is low in salicylic COP-based (cycloolefin-based) polymers, and high in aromatic PC (polycarbonate)-based polymers. Thus, while an aliphatic character of the polymer may be enhanced to reduce the photoelastic coefficient, an orientation property is deteriorated in trade-off relation. Therefore, with a view to realizing the orientation property at a level represented by the formula (2) in the appended claim 1, it is conceived to introduce a structure having a high orientation property even in an aliphatic polymer, specifically, a segment constructing a long rigid cyclic structure or crystalline structure in a main chain direction. In a polymer film having a side-chain component whose absorption wavelength is located on a longer wavelength side, the orientation property of the high molecular weight complex is enhanced.

As used in this specification, the term "stretched film" means a plastic film having molecular orientation enhanced in a specific direction by applying tension to an unstretched film at an appropriate temperature or by additionally applying tension to a film stretched in advance.

A retardation film according to one embodiment of the present invention contains a polymer having at least a repeating unit represented by the following general formula (I):

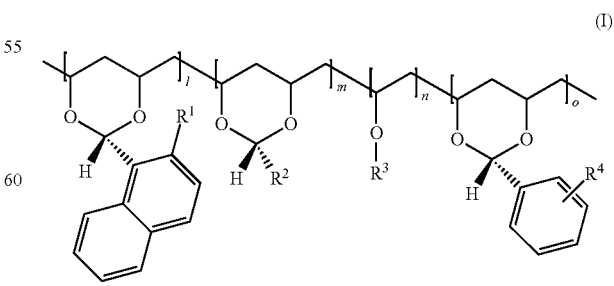

For example, the above polymer can be obtained by subjecting at least two types of aldehyde compounds and/or ketone compounds, and a polyvinyl alcohol-based resin, to a condensation reaction. In the polymer represented by the general formula (I), an arrangement sequence of basic units l, m, n, o is not particularly limited, but may be an alternate, random or block arrangement.

In the general formula (I), $R^1$ represent a hydrogen atom, a halogen atom, a straight-chain or branched alkyl group having a carbon number of 1 to 4, a straight-chain or branched alkyl halide group having a carbon number of 1 to 4, a straight-chain or branched alkoxy group having a carbon number of 1 to 4, an alkoxycarbonyl group, an acyloxy group, an amino group, an azido group, a nitro group, a cyano group or a hydroxyl group (wherein $R^1$ is not a hydrogen atom). The $R^1$ is a substituent substituting 2-position of the naphthyl ring. Preferably, the $R^1$ is a methoxy group.

The $R^1$ is used to control steric conformation of the naphthyl ring to which the substituent bonded. More specifically, it is assumed that, due to steric hindrance, the substituent is more likely to be coordinated between two oxygen atoms in the general formula (1). Thus, a planar structure of the naphthyl ring is oriented substantially perpendicularly to a virtual line connecting the two oxygen atoms. This polymer can be used to obtain a retardation film excellent in transparency and processability.

In the general formula (I), the basic unit; l can be obtained, for example, through a condensation reaction between a polyvinyl alcohol-based resin, and 1-naphthaldehydes or 1-naphthones. With regard to the 1-naphthaldehydes, a suitable type may be appropriately employed. For example, the 1-naphthaldehydes include 2-methoxy-1-naphthaldehyde, 2-ethoxy-1-naphthaldehyde, 2-propoxy-1-naphthaldehyde, 2-methyl-1-naphthaldehyde, 2-hydroxy-1-naphthaldehyde. With regard to the 1-naphthones, a suitable type may be appropriately employed. For example, the 1-naphthones include 2-hydroxy-1-acetonaphthone, 8'-hydroxy-1'-benzonaphthone. Among them, 2-methoxy-1-naphthaldehyde is preferable (in this case, in the general formula (I), the $R^1$ is a methoxy group, and each of the A and B is a hydrogen atom).

The 1-naphthaldehydes can be obtained by any suitable synthesis method. The synthesis method for the 1-naphthaldehydes includes a method which comprises: allowing substituted or unsubstituted naphthoic acid to react with any alcohol to form substituted or un-substituted naphthoate ester; and then reducing the naphthoate ester by a reducing agent, such as diisobutylaluminum hydride or hydrogenated bis(2-methoxyethoxy) aluminum sodium, as described, for example, in JP 09-040600A and JP 09-110775A. As the 1-naphthaldehydes, it is possible to use commercially available products, without modification.

The 1-naphthones can be obtained by any suitable synthesis method. The synthesis method for the 1-naphthones includes a method which comprises: allowing substituted or unsubstituted naphthoic acid to react with appropriate halide phosphate or thionyl chloride to form acyl halide; and then allowing the acyl halide to further react with an appropriate nucleophilic reagent. Alternatively, a method described in Reference Example 1 in JP 2846418 B2 may also be employed.

In the general formula (I), $R^2$ represents a hydrogen atom, a straight-chain or branched alkyl group having a carbon number of 1 to 4, a substituted or unsubstituted cycloalkyl group having a carbon number of 5 to 10, a substituted or unsubstituted phenyl group, a substituted or unsubstituted naphthyl group, or a substituted or un-substituted heterocyclic group. A polymer having the substituent introduced into the $R^2$ has excellent solubility with respect to an all-purpose solvent (e.g., acetone, ethyl acetate or toluene). Preferably, $R^2$ is a straight-chain or branched alkyl group having a carbon number of 1 to 4.

In the general formula (I), the basic unit; m can be obtained, for example, through a condensation reaction between a polyvinyl alcohol-based resin and any aldehyde or ketone compound. The aldehyde compound includes formaldehyde, acetaldehyde, 1,1-diethoxyethane (acetal), propionaldehyde, n-butyraldehyde, isobutyraldehyde, cyclohexane carboxyaldehyde, 5-norbornene-2-carboxyaldehyde, 3-cyclohexene-1-carboxyaldehyde, dimethyl-3-cyclohexene-1-carboxyaldehyde, benzaldehyde, 2-chlorobenzaldehyde, p-dimethylaminobenzaldehyde, t-butylbenzaldehyde, 3,4-dimethoxybenzaldehyde, 2-nitrobenzaldehyde, 4-cyanobenzaldehyde, 4-carboxybenzaldehyde, 4-phenylbenzaldehyde, 4-fluorobenzaldehyde, 2-(trifluoromethyl)benzaldehyde, 1-naphthaldehyde, 2-naphthaldehyde, 6-methoxy-2-naphthaldehyde, 3-methyl-2-thiophenecarboxyaldehyde, 2-pyridinecarboxyaldehyde and indole-3-carboxyaldehyde.

The ketone compound includes acetone, ethyl methyl ketone, diethyl ketone, t-butyl ketone, dipropyl ketone, allyl ethyl ketone, acetophenone, p-methylacetophenone, 4'-aminoacetophenone, p-chloroacetophenone, 4'-methoxyacetophenone, 2'-hydroxyacetophenone, 3'-nitroacetophenone, P-(1-piperidino) acetophenone, benzalacetophenone, propiophenone, benzophenone, 4-nitrobenzophenone, 2-methylbenzophenone, p-bromobenzophenone, cyclohexyl (phenyl)methanone, 2-butyronaphthone and 1-acetonaphthone.

In the general formula (I), $R^3$ represents a hydrogen atom, a straight-chain or branched alkyl group having a carbon number of 1 to 4, a benzyl group, a silyl group, a phosphate group, an acyl group, a benzoyl group or a sulfonyl group.

The $R^3$ is used to protect a remaining hydroxyl group (called "end cap treatment") to thereby adjust a water absorption rate to an appropriate value. For example, when the above polymer is used as a retardation film, the water absorption rate may be set to a small value to allow the retardation film to have high transparency and excellent retardation stability. Depending on use or purpose of the polymer of the present invention, the substituent may not be subject to the end cap treatment (that is, $R^3$ may be maintained as a hydrogen atom). As the $R^3$, it is possible to use any suitable group (typically, a protecting group) capable of, after obtaining a polymer having a hydroxyl group remaining therein, reacting with the hydroxyl group to form a substituent (that is, capable of the end cap treatment).

For example, the protective group includes benzyl group, 4-methoxyphenylmethyl group, methoxymethyl group, trimethylsilyl group, triethylsilyl group, t-butyldimethylsilyl group, acetyl group, benzoyl group, methanesulfonyl group, and bis-4-nitrophenyl phosphite. Preferably, $R^3$ is trimethylsilyl group, triethylsilyl group or t-butyldimethylsilyl group. The use of these substituents makes it possible to obtain a retardation film having high transparency and excellent retardation stability even in high-temperature and high-humidity environments.

With regard to reaction conditions for the end cap treatment, suitable condition may be appropriately employed, depending on a type of substituent for reaction with a hydroxyl group. For example, reaction such as alkylation, benzylation, sililation, phosphorylation or sulfonylation can be performed by stirring a polymer having a hydroxyl group remaining therein and a chloride of an intended substituent, in the presence of a catalyst, such as 4(N,N-dimethylamino) pyridine, at a temperature of 25° C. to 100° C. for 1 to 20 hours.

In the general formula (I), the basic unit; o can be introduced, for example, as an aldehyde compound, by using a substituted or unsubstituted benzaldehyde. The use of this polymer makes it possible to obtain a retardation film having further excellent transparency.

In the general formula (I), $R^4$ represents a hydrogen atom, a halogen atom, a straight-chain or branched alkyl group having a carbon number of 1 to 4, a straight-chain or branched alkyl halide group having a carbon number of 1 to 4, a straight-chain or branched alkoxy group having a carbon number of 1 to 4, an alkoxycarbonyl group, an acyloxy group, an amino group, a nitro group, a cyano group or a hydroxyl group. $R^4$ is a substituent substituting ortho-position, meta-position or p-position of the benzene ring.

In the general formula (I), with regard to ratios of the basic units l, m, n and o, suitable values may be appropriately selected, depending on the purpose. The ratio of the basic unit; l is set preferably in the range of 1 mol % to 20 mol %, more preferably in the range of 5 mol % to 15 mol %. The ratio of the basic unit; m is set preferably in the range of 25 mol % to 50 mol %, more preferably in the range of 30 mol % to 50 mol %. The ratio of the basic unit; n is set preferably in the range of 10 mol % to 55 mol %, more preferably in the range of 15 mol % to 50 mol %. The ratio of the basic unit; o is preferably in the range of 1 mol % to 20 mol %, more preferably in the range of 5 mol % to 15 mol %.

Further, a ratio [1/(m+o)] (mol/mol) of the basic unit 1 to a total of the basic units m and o is set preferably in the range of 0.10 to 0.50, more preferably in the range of 0.12 to 0.40, particularly preferably in the range of 0.15 to 0.30. The setting of the ratios of the basic units; l, m, n and o in the above ranges allows, for example, a retardation film containing the above polymer to exhibit excellent properties such as to have transparency, retardation-causing capability and reverse wavelength dispersion property together.

A weight-average molecular weight of the above polymer is set preferably in the range of 1,000 to 1,000,000, more preferably in the range of 3,000 to 500,000, particularly preferably in the range of 5,000 to 300,000. The setting of the weight-average molecular weight in the above range makes it possible to obtain an retardation film excellent in mechanical strength. The weight-average molecular weight can be calculated by the gel permeation chromatography (GPC) method using polystyrene as a standard sample. As an analyzer, it is possible to use "HLC-8120GPC" produced by TOSOH Corporation (column: TSK gel Super HM-H/H4000/H3000/H2000, column size: 6.0 mm I.D.×150 mm each, eluant: tetrahydrofuran, flow rate: 0.6 ml/min, detector: RI, column temperature: 40° C., injection volume: 20 μL).

A glass transition temperature of the above polymer is set preferably in the range of 90° C. to 190° C., more preferably in the range of 100° C. to 170° C., particularly preferably in the range of 110° C. to 160° C. The setting of the glass transition temperature in the above range makes it possible to obtain an optical film excellent in heat resistance. The glass transition temperature can be measured by the DSC method according to JIS K 7121 (1987).

The polymer film containing the above polymer may further contain any suitable additive. For example, the additive includes plasticizer, heat stabilizer, light stabilizer, lubricant, antioxidant, ultraviolet absorbing agent, flame retardant, antistatic agent, compatibilizing agent, cross-linking agent, and thickener. With regard to an amount of the additive to be used, a suitable value may be appropriately selected, depending on the purpose. The amount of the additive is set preferably in the range of greater than 0 to 10 (weight ratio), more preferably in the range of greater than 0 to 5 (weight ratio), with respect to 100 weight parts of the polymer.

With regard to a thickness of the polymer film, a suitable value may be appropriately set, depending on the purpose. The thickness is set preferably in the range of 10 μm to 300 μm, more preferably in the range of 20 μm to 200 μm, particularly preferably in the range of 30 μm to 150 μm. The setting of the thickness in the above range makes it possible to obtain a film excellent in mechanical strength and thickness uniformity.

A transmittance of the polymer film is set preferably to 85% or more, more preferably to 90% or more.

The absolute value (C (m²/N)) of the photoelastic coefficient of the polymer film is set preferably in the range of $1 \times 10^{-12}$ to $50 \times 10^{-12}$, more preferably in the range of $10 \times 10^{-12}$ to $45 \times 10^{-12}$. The usage of the polymer film having an absolute value of the photoelastic coefficient in the above range makes it possible to obtain, for example, a liquid crystal display device excellent in display uniformity.

A retardation film according to another embodiment of the present invention is a stretched film of a polymer film comprising a primary component consisting of a polyvinyl acetal-based resin having a structure represented by the following general formula (II). The polyvinyl acetal-based resin can be obtained through a condensation reaction (also referred to as "acetalization") using a polyvinyl alcohol-based resin, and two or more types of aldehydes, two or more types of ketones, or at least one type of aldehyde and at least one type of ketone. A stretched film of the polymer film comprising a main component consisting of a polyvinyl acetal-based resin having a structure represented by the following general formula (II) makes it possible to obtain a retardation film which exhibits a reverse wavelength dispersion property and has excellent formability/processability, stretchability and retardation stability. In addition, the retardation film is excellent in stretch-orientation property, so that a thickness of the retardation film can be thin.

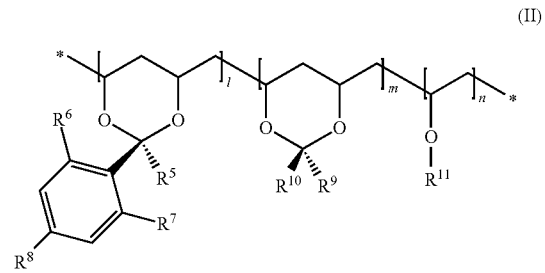

(II)

(In the general formula (II), $R^5$, $R^9$, and $R^{10}$ each independently represent a hydrogen atom, a straight-chain, branched-chain or cyclic alkyl group having a carbon number of 1 to 8, a phenyl group which may have a substituent, a naphthyl group which may have a substituent, an anthranyl group which may have a substituent, or a phenanthrenyl group which may have a substituent. $R^6$, $R^7$, and $R^8$ each independently represent a hydrogen atom, a straight-chain, branched-chain or cyclic alkyl group having a carbon number of 1 to 4, a straight-chain or branched-chain alkoxy group having a carbon number of 1 to 4, a halogen atom, a alkyl halide group, a nitro group, an amino group, a hydroxyl group, a cyano group, or a thiol group, wherein the $R^6$ and $R^7$ are not simultaneously hydrogen atoms. $R^{11}$ represents a hydrogen atom, a straight-chain, branched-chain or cyclic alkyl group having a carbon number of 1 to 8, a benzyl group, a silyl group, a phosphoric group, an acyl group, a benzoyl group, or a sulfonyl group. Each of l, m and n represents an integer of 1 or more.)

In the general formula (II), substituents for the $R^9$ and $R^{10}$ are used to more finely control a wavelength dispersion property of a retardation film obtainable by stretching the polymer film comprising a main component consisting of a polyvinyl acetal-based resin having a structure represented by the general formula (II). More specifically, the introduction of substituents to the $R^9$ and $R^{10}$ can orient the substituents in a direction approximately parallel to a stretching direction when the polymer film is subjected to stretching. It is believed that the wavelength dispersion property of the retardation film of the present invention can be obtained by interaction of the wavelength dispersion property of the benzene ring oriented approximately perpendicularly to the virtual line connecting the two oxygen atoms, the wavelength dispersion property of the main chain structure, and a wavelength dispersion property of the substituents introduced to the $R^9$ and $R^{10}$ described here. Further, the formability/processability, stretchability, retardation stability and stretch-orientation property of the polymer film can be further improved.

Each of the $R^9$ and $R^{10}$ may be appropriately selected, for example, according to a type of aldehyde (typically, benzaldehydes) or ketone (typically, acetophenones or benzophenons) to be subjected to reaction with alcohol when the polyvinyl acetal-based resin is obtained. Specific examples of aldehyde and ketone are as described above.

The $R^9$ is preferably a hydrogen atom or a methyl group, most preferably a hydrogen atom. The $R^{10}$ is preferably a methyl group or an ethyl group, most preferably an ethyl group. The introduction of the above substituents can make it possible to obtain a retardation film having significantly excellent formability/processability, stretchability, retardation stability, and stretch-orientation property.

In the general formula (II), a substituent for the $R^{11}$ is used to protect a remaining hydroxyl group (end cap treatment) to thereby adjust the water absorption rate to an appropriate value and enhance solubility of resins with respect to a solvent, formability/processability, and retardation stability. Thus, depending on a water absorption rate or optical properties of an obtained retardation film, or use of the retardation film of the present invention, the $R^{11}$ may not be subjected to the end cap treatment, and maintained as a hydrogen atom.

The $R^{11}$ can be obtained through the end cap treatment using, for example, a group capable of reacting with a hydroxyl group to form a substituent (typically, a protective group), after obtaining a polyvinyl acetal-based resin having a hydroxyl group remaining therein. A specific example of the protective group includes a benzyl group, a 4-methoxyphenylmethyl group, a methoxymethyl group, a trimethylsilyl group, a triethylsilyl group, a t-butyldimethylsilyl group; an acetyl group; a benzoyl group; a methanesulfonyl group; and bis-4-nitrophenylphosphite. With regard to reaction conditions for the end cap treatment, suitable conditions may be appropriately employed, depending on a type of substituent for reacting with a hydroxyl group. For example, a reaction such as alkylation, benzylation, silylation, phosphorylation, sulfonylations or the like may be performed by stilling a polyvinyl acetal-based resin having a hydroxyl group remaining therein and a chloride of an intended substituent, in the presence of a catalyst such as 4-(N,N-dimethylamino) pyridine at a temperature of 25° C. to 100° C. for 1 hour to 20 hours. Preferably, the $R^{11}$ is one type of silyl group selected from a trimethylsilyl group, a triethylsilyl group, and a t-butylmethylsilyl group. The use of these substituents make it possible to obtain a retardation film capable of exhibiting excellent retardation stability and maintaining high transparency even in environments such as high-temperature and high-humidity environments.

In the general formula (II), with regard to ratios of l, m and n, suitable values may be appropriately selected, depending on a type of substituent and an purpose thereof. Preferably, the l, m and n are, respectively, set preferably in the range of 5 to 30 (mol %), in the range of 20 to 80 (mol %) and in the range of 1 to 70 (mol %), particularly preferably in the range of 10 to 28 (mol %), in the range of 30 to 75 (mol %), and in the range of 1 to 50 (mol %), most preferably, in the range of 15 to 25 (mol %), in the range of 40 to 70 (mol %) and in the range of 10 to 40 (mol %), with respect to 100 (mol %) of a total of the l, m and n. The ratios of the l, m and n in the above ranges makes it possible to obtain a retardation film exhibiting a reverse wavelength dispersion property and having significantly excellent formability/processability, stretchability, retardation stability, and stretch-orientation property.

<5. Production Method for Polymer Film>

A polymer film containing the above polymer can be obtained by any suitable forming/processing method. For example, the forming/processing method includes a compression molding method, a transfer molding method, an injection molding method, an extrusion molding method, a blow molding method, a powder molding method, a FRP molding method, and a solvent casting method. Preferably, the forming/processing method is the solvent casting method or the extrusion molding method. Specifically, the solvent casting method comprises, for example: defoaming a concentrated solution (dope) in which a composition comprising a polymer as a main component and an additive is dissolved in a solvent; casting the solution in the form of a sheet on a surface of an endless stainless belt or a rotary drum to form a film by vaporizing the solvent. The extrusion molding method comprises, for example: heating and melting a composition comprising a polymer as a main component and an additive; extruding the molten composition in the form of a sheet on a surface of a casting roll using a T-die or the like to form a film by cooling. Through the use of the above method, it becomes possible to obtain a polymer film excellent in thickness uniformity.

<6. Polarizing Plate>

A polarizing plate according to one embodiment of the present invention comprises a polarizer and the above retardation plate. FIG. 1 is a schematic sectional view of a polarizing plate using a retardation film, according to a preferred embodiment of the present invention. A polarizing plate illustrated in FIG. 1(a) comprises a polarizer 1, an optional protective layer 2 provided on one side of the polarizer 1, and a retardation film 4 provided on the other side. A polarizing plate illustrated in FIG. 1(b) comprises a polarizer 1, an optical film 3 provided on one side of the polarizer 1, and a retardation film 4 provided on the other side. A polarizing plate illustrated in FIG. 1(c) comprises a polarizer 1, an optional protective layer 2 provided on one side of the polarizer 1, an optional protective layer 2' provided on the other side, and a retardation film 4 provided on the protective layer 2' on a side opposite to the polarizer 1. A polarizing plate illustrated in FIG. 1(d) comprises a polarizer 1, two optical films 3, 3' provided, respectively, on opposite sides of the polarizer 1, and a retardation film 4 provided on the optical film 3' on a side opposite to the polarizer 1. The optional protective layers 2, 2' may be identical to each other or may be different from each other. The optical films 3, 3' may be identical to each other or may be different from each other.

In one example of the polarizing plate of the present invention, an absorption axis direction of the polarizer is substantially parallel or substantially perpendicular to a slow axis direction of the retardation film. As used in this specification, the term "substantially parallel" encompasses a situation where an angle defined between the absorption axis direction of the polarizer and the slow axis direction of the retardation film falls within 0 degree±2.0 degrees, preferably 0 degree±1.0 degree, more preferably 0 degree±0.5 degrees. The term "substantially perpendicular" encompasses a situation where the angle defined between the absorption axis direction of the polarizer and the slow axis direction of the retardation film falls within 90 degrees±2.0 degrees, preferably 90 degree±1.0 degree, more preferably 90 degree±0.5 degrees. In this case, it becomes possible to eliminate an influence of birefringence of the retardation film on display properties of a liquid crystal display, in a normal viewing direction, while allowing a liquid crystal cell to be optically compensated by the birefringence of the retardation film, in oblique viewing directions. This makes it possible to obtain a liquid crystal display having a high contrast ratio in not only the normal viewing direction but also the oblique viewing directions.

In one example of the polarizing plate of the present invention, the angle defined between the absorption axis direction of the polarizer and the slow axis direction of the retardation film is substantially 45 degrees. As used in this specification, the term "substantially 45 degrees" encompasses a situation where the angle defined between the absorption axis direction of the polarizer and the slow axis direction of the retardation film falls within 45 degrees±3.0 degrees, preferably 45 degrees±1.0 degree, more preferably 45 degrees±0.5 degrees. In this case, it becomes possible to obtain an excellent circularly polarizing plate capable of converting linearly polarized light into circularly polarized light (or circularly polarized light into linearly polarized light) in a wide range of visible light.

Practically, a layer of bonding or adhesive agent (not illustrated) is provided between the polarizer and a member (optional protective layer, optical film, retardation film) adjacent thereto to allow the polarizer and the member to be laminated to each other. In this manner, the deposition of the retardation film of the present invention on at least one side of the polarizer makes it possible to obtain a display excellent in display uniformity, for example.

With regard to the polarizer, a suitable type capable of converting natural light or polarized light to linearly polarized light may be appropriately employed. Preferably, the polarizer is a stretched film comprising a primary component consisting of a polyvinyl alcohol-based resin containing iodine or dichroic dye.

With regard to the dichroic dye, any suitable type may be employed. As used in this specification, the term "dichroic" means an optical anisotropy in which absorbance of light varies in two directions: an optic axis direction; and a direction perpendicular thereto.

As the polymer film comprising a primary component consisting of a polyvinyl alcohol-based resin, for use in the present invention, it is possible to use a commercially available film without modification. For example, the commercially available polymer film comprising a primary component consisting of a polyvinyl alcohol-based resin includes "Kuraray Vinylon Film" (trade name; produced by Kuraray Co., Ltd.), "Tohcello Vinylon Film" (trade name; produced by Tohcello Co., Ltd.) and "Nichigo Vinylon Film" (trade name; produced by Nippon Synthetic Chemical Industry Co., Ltd.).

Figure 2:
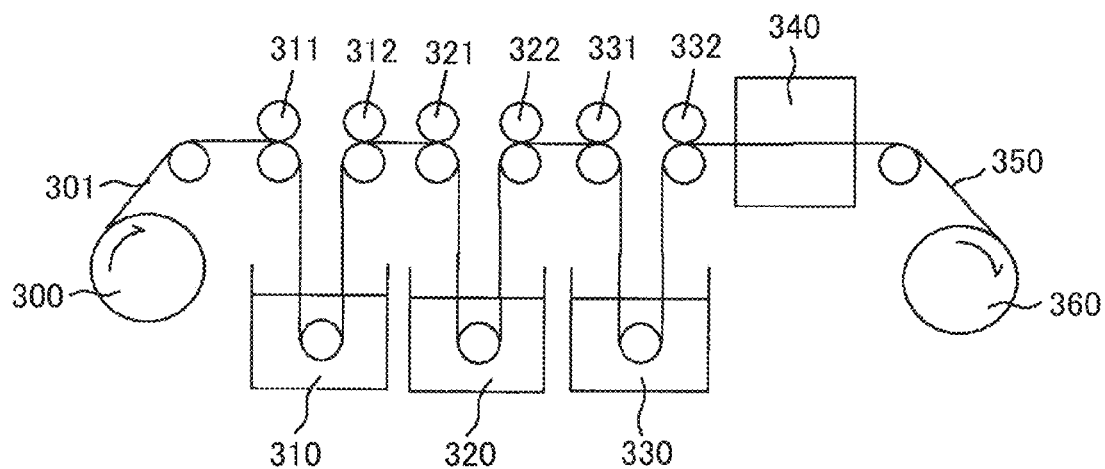
FIG. 2 is a schematic diagram illustrating a concept of a typical production process for a polarizer usable in the present invention.

With reference to FIG. 2, an example of a production method for a polarizer will be described. FIG. 2 is a schematic diagram illustrating a concept of a typical production process of a polarizer for use in the present invention. For example, a polymer film 301 comprising a primary component consisting of a polyvinyl alcohol-based resin is fed from a feeding section 300, and after being immersed in an aqueous iodine solution bath 310, subjected to swelling and dyeing step under a condition that tension is applied to the film in its longitudinal direction by rolls 311, 312 driven at different rotation speed ratios. Then, the film is immersed in a bath 320 of an aqueous solution containing boric acid and potassium iodide, and subjected to a cross-linking treatment under a condition that tension is applied to the film in its longitudinal direction by rolls 321, 322 driven at different rotation speed ratios. The film subjected to the cross-linking treatment is immersed in a bath 330 of an aqueous solution containing potassium iodide, and subjected to water washing treatment, according to rolls 331 and 332. The film subjected to the water washing treatment is dried by drying means 340 to adjust a water content, for example, to fall within the range of 10% to 30%, and taken up by a take-up section 360. A polarizer 350 can be obtained by stretching the film comprising a main component consisting of a polyvinyl alcohol-based resin, 5 times to 7 times with respect to its original length, through the above process.

With regard to the optional protective layer, a suitable type may be appropriately employed. The protective layer is used to prevent a polarizer from shrinking and expanding, and/or prevent degradation of the polarizer due to ultraviolet light. A specific example of a material usable as a main component of the film includes: a cellulose-based resin such as triacetylcellulose (TAC); and a transparent resin such as a polyester-based, polyvinyl alcohol-based, polycarbonate-based, polyamide-based, polyimide-based, polyether sulfone-based, polysulfone-based, polystyrene-based, polynorbornene-based, polyolefin-based, acrylic-based, or acetate-based resin. Further, the specific example includes thermosetting resin or UV-curable resin such as an acrylic-based, urethane-based, acrylic urethane-based, epoxy-based, or silicone-based resin. Furthermore, the specific example includes a glassy polymer such as a siloxane-based polymer. When a plurality of protective layers are used, they may be identical to each other or may be different from each other.

Preferably, the protective layer is transparent and colorless. Specifically, the retardation in the thickness direction is set preferably in the range of −90 nm to +90 nm, more preferably in the range of −80 nm to +80 nm, most preferably in the range of −70 nm to +70 nm.

With regard to a thickness of the protective layer, any suitable value may be employed as long as the desired thickness-direction retardation can be obtained. Specifically, the thickness of the protective layer is set preferably to 100 μm or less, more preferably to 80 μm or less, particularly preferably to 40 μm or less.

Referring to FIG. 1, an optional surface-treated layer may be formed on a surface of each of the optional protective layers 2, 2' and the optical films 3, 3'. The surface-treated layer may be a treated layer subjected to a treatment such as a hard coat treatment, an antistatic treatment, an anti-reflection treatment, and a diffusion treatment (also referred to as "anti-glare treatment"). These surface-treated layers are used for the purpose of preventing staining or scratching of a screen or preventing difficulty in viewing display images due to glare of room fluorescent light or sunlight on a screen. As the surface-treated layer, a layer is generally used which is formed by fixing a treatment agent for forming the treated layer on the surface of a base film. The base film may additionally serve as the protective layer or the optical film. The surface-treated layer may have a multilayer structure such as a laminate having a hard-coat treatment layer stacked on an antistatic treatment layer. As the surface-treated layer, a commercially available surface-treated layer may be used without modification. For example, the commercially-available, hard coat-treated and antistatic-treated film includes "KC8UX-HA" (trade name; produced by Konica Minolta Opto, Inc.). For example, the commercially-available, antireflection-treated layer includes ReaLook series produced by Nippon Oil & Fats Co., Ltd.

<7. Display Panel Device>

A display panel device according to one embodiment of the present invention comprises the above polarizer plate, and a display panel, such as a liquid crystal panel or an organic EL display panel. The polarizer plate and the optical panel may be directly adhesively bonded together, or may be arranged through any member such as a touch panel or other optical member.

EXAMPLES

The present invention will be more specifically described based on the following Examples. It is to be understood that the present invention is not limited to the following Examples. Analysis methods used in Examples are as follows.

(1) Measurement of Composition Ratio

A composition ratio was measured using a nuclear magnetic resonance spectrometer [trade name "LA 400"; produced by JEOL Ltd.] (Measurement solvent; deuterated DMSO, frequency; 400 MHz, observation nucleus; $^1$H, measured temperature; 70° C.).

(2) Measurement Method for Thickness

A thickness of less than 10 μm was measured using a thin film spectrophotometer "Instantaneous Multichannel Photodetector system MCPD-2000)" (trade name; produced by Otsuka Electronics Co., Ltd.). A thickness of 10 μm or more was measured using a digital micrometer "KC-351C-type" (trade name; produced by Anritsu Corporation).

(3) Measurement Method for Refractive Index of Film

A refractive index of a film was measured using an Abbe refractometer "DR-M4" (trade name; produced by Atago Co., Ltd.) based on light having a wavelength of 589 nm at 23° C.

(4) Measurement Method for Retardation Value (Re, Rth)

Retardation values were measured using "AxoScan" (trade name; produced by Axometrics Inc.) in a room at 23° C.

(5) Measurement Method for Transmittance

A transmittance can be measured using a spectrophotometer "DOT-3" (trade name; produced by Murakami Color Research Laboratory) based on light having a wavelength of 550 nm at 23° C.

(6) Measurement Method for Folding Endurance (Cycle)

A folding endurance was measured at a load of 200 g according to JIS P 8115 by using "BE202MIT Folding Endurance Tester" (produced by Tester Co., Ltd.), in two cases where a sample having a size of 100 mm×15 mm is cut from a stretched film in such a manner that a long side of the sample is cut along a longitudinal direction (MD direction) of the film and along a width direction (TD direction) of the film.

(7) Measurement Method for Absolute Value (C [550]) of Photoelastic Coefficient

A retardation (23° C.) of a sample (size: 2 cm×10 cm) was measured at a center of the sample while clamping opposite ends of the sample to apply a stress (5 to 15N) by using a spectroscopic ellipsometer "M-220" (trade name; produced by JASCO Corporation), and an absolute value (C[550]) was calculated from a slope of a function of the stress and the retardation.

(8) Measurement Method for Reflection Spectrum of Display Panel Device

A reflection spectrum was measured using a spectrophotometric colorimeter "CM-2600d" (trade name: produced by Konica Minolta Sensing, Inc.) in a room at 23° C.

(9) Measurement Method in Heating Test on Display Panel Device

Before a heating test, chromaticities (reflection hues) at 45 points on a surface of a display screen of a display panel device were measured using a spectrophotometric colorimeter "CM-2600d" (trade name; produced by Konica Minolta Sensing, Inc.). The measurement points were set, respectively, at centers of 45 areas defined by dividing the display screen equally vertically and horizontally into 5×9 pieces. Further, uniformity of reflection color on the entire display screen was visually evaluated. Subsequently, after the display panel device was stored in a constant-temperature oven at 85° C. for 96 hours (heating test), chromaticities at the 45 points on the display screen were measured in the same manner. Further, uniformity of reflection color on the entire display screen was visually evaluated.

Example 1

8.8 g of polyvinyl alcohol-based resin [trade name "NH-18", produced by Nippon Synthetic Chemical Industry Co., Ltd. (polymerization degree=1800, saponification degree=99.0%)] was dried at 105° C. for 2 hours and thereafter dissolved in 167.2 g of dimethyl sulfoxide (DMSO). 2.98 g of 2-methoxy-1-naphthaldehyde and 0.80 g of p-toluenesulfonate monohydrate were added thereto, and stirred at 40° C. for 1 hour. 3.18 g of benzaldehyde was added to the reaction solution, and stirred at 40° C. for 1 hour. Then, 4.57 g of dimethylacetal was further added thereto, and stirred at 40° C. for 3 hours. Then, 2.13 g of triethylamine was added thereto to finish the reaction. The obtained crude product was subject to reprecipitation by 1 L methanol. A filtered polymer was dissolved in tetrahydrofuran and re-subject to reprecipitation by methanol. This was filtered and dried to obtain 11.9 g of a white polymer. This polymer was measured by $^1$H-NMR. As a result, it had a repeating unit represented by the following formula (III), and a ratio (molar ratio) of l:m:n:o was 10:25:52:11. Further, the absolute value (C) of the photoelastic coefficient was $27×10^{-12}$ (m$^2$/N).

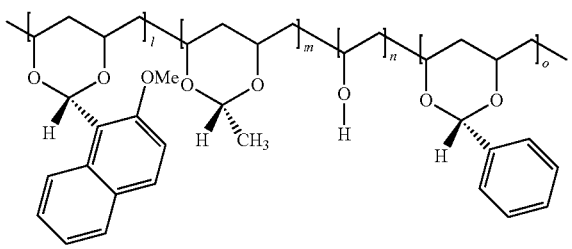

(III)

The obtained polymer was dissolved in methyl ethyl ketone (MEK), and applied onto a polyethylene terephthalate film (thickness: 70 μm) using an applicator, dried in an air circulation type drying oven at 130° C. and thereafter peeled from the polyethylene terephthalate film to prepare a film having a thickness of 135 μm. This film was subjected to transverse uniaxial stretching at a stretching rate of 2.1 times by a stretching machine in an air circulation type drying oven at 130° C. to prepare a stretched film (retardation film) A-1. Properties of the obtained retardation film A-1 are illustrated in Table 1.

of the film before stretching, the stretching temperature, and the stretching ratio, were changed, respectively, to 142 μm, 139° C. and 1.9 times, instead of 135 μm, 135° C. and 2.1 times. Properties of the obtained retardation film A-5 are illustrated in Table 1.

Example 6

11.7 g of white polymer was obtained in the same manner as that in Example 1, except that 8.81 g of acetaldehyde was added, instead of dimethylacetal, and the amount of

TABLE 1

| | Wavelength Dispersion | | | Photoelastic | | Folding Endurance [cycle] | | Widthwise Stretching Ratio | Uniformity of Reflection |
|---|---|---|---|---|---|---|---|---|---|
| | Properties Re[450]/Re[550] | Δn [×10⁻³] | NZ | Coefficient [10⁻¹² m²/N] | Reflection Color | MD Direction | TD Direction | | Color after Heating Test |
| Example 1 | 0.89 | 2.3 | 1.18 | 27 | Black | 160 | 550 | 2.1 | ○ |
| Example 2 | 0.89 | 2.1 | 1.40 | 27 | Black | 190 | 560 | 2.2 | ○ |
| Example 3 | 0.89 | 3.1 | 1.14 | 27 | Black | 155 | 556 | 2.8 | ○ |
| Example 4 | 0.89 | 4.9 | 1.21 | 27 | Black | 165 | 540 | 2.7 | ○ |
| Example 5 | 0.89 | 1.9 | 1.30 | 27 | Black | 173 | 562 | 1.9 | ○ |
| Example 6 | 0.97 | 4.2 | 1.20 | 27 | Black | 161 | 554 | 2.5 | ○ |
| Example 7 | 0.76 | 1.8 | 1.40 | 27 | Black | 198 | 532 | 2.1 | ○ |
| Example 8 | 0.91 | 2.5 | 1.30 | 39 | Black | 124 | 420 | 2.1 | ○ |
| Example 9 | 0.91 | 4.2 | 1.22 | 39 | Black | 119 | 400 | 2.4 | ○ |
| Example 10 | 0.84 | 1.9 | 1.35 | 20 | Black | 180 | 550 | 2.1 | ○ |
| Comparative Example 1 | 1.01 | 1.6 | 1.40 | 27 | Blue | 184 | 530 | 2.0 | ○ |
| Comparative Example 2 | 0.89 | 1.4 | 1.50 | 27 | Red | 200 | 520 | 1.4 | ○ |
| Comparative Example 3 | 0.89 | 2.0 | 1.12 | 27 | Black | 712 | 20 | NA | ○ |
| Comparative Example 4 | 0.90 | 2.5 | 1.00 | 59 | Black | 690 | 4 | NA | x |

Example 2

A stretched film (retardation film) A-2 was prepared in the same manner as that in Example 1, except that the thickness of the film before stretching, the stretching temperature, and the stretching ratio, were changed, respectively, to 150 μm, 133° C. and 2.2 times, instead of 135 μm, 135° C. and 2.1 times. Properties of the obtained retardation film A-2 are illustrated in Table 1.

Example 3

A stretched film (retardation film) A-3 was prepared in the same manner as that in Example 1, except that the thickness of the film before stretching, the stretching temperature, and the stretching ratio, were changed, respectively, to 130 μm, 130° C. and 2.8 times, instead of 135 μm, 135° C. and 2.1 times. Properties of the obtained retardation film A-3 are illustrated in Table 1.

Example 4

A stretched film (retardation film) A-4 was prepared in the same manner as that in Example 1, except that the film formation temperature, the thickness of the film before stretching, the stretching temperature and the stretching ratio, were changed, respectively, to 90° C., 100 μm, 125° C. and 2.5 times, instead of 130° C., 135 μm 135° C. and 2.1 times. Properties of the obtained retardation film A-4 are illustrated in Table 1.

Example 5

A stretched film (retardation film) A-5 was prepared in the same manner as that in Example 1, except that the thickness 2-methoxy-1-naphthaldehyde was set to 2.89 g. As a result of the measurement by $^1$H-NMR, the polymer had a repeating unit represented by the following formula (IV), and a ratio (molar ratio) of l:m:n:o was 11:54:28:7.

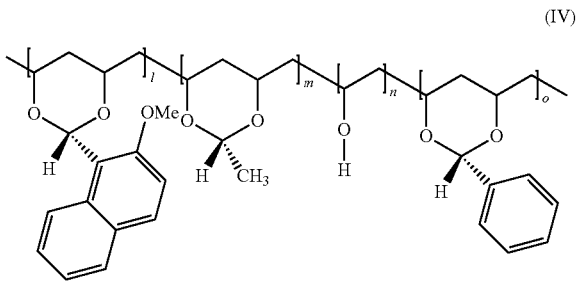

(IV)

The obtained polymer was dissolved in methyl ethyl ketone (MEK), applied onto a polyethylene terephthalate film (thickness: 70 μm) using an applicator, dried in an air circulation type drying oven at 130° C. and thereafter peeled from the polyethylene terephthalate film to prepare a film having a thickness of 95 μm. This film was subjected to transverse uniaxial stretching at a stretching rate of 2.5 times by a stretching machine in an air circulation type drying oven at 130° C. to prepare a stretched film (retardation film) B. Properties of the obtained retardation film B are illustrated in Table 1.

Example 7

8.8 g of polyvinyl alcohol-based resin "NH-18" (trade name: produced by Nippon Synthetic Chemical Industry Co., Ltd. (polymerization degree=1800, saponification degree=99.0%)) was dried at 105° C. for 2 hours and thereafter dissolved in 167.2 g of dimethyl sulfoxide (DMSO). 2.98 g of 2-methoxy-1-naphthaldehyde and 0.80 g of p-toluenesulfonate monohydrate were added thereto, and stirred at 40° C. for 1 hour. 3.18 g of benzaldehyde was added to the reaction solution, and stirred at 40° C. for 1 hour. Then, 10.4 g of 2,2-dimethoxypropane was further added thereto, and stirred at 40° C. for 3 hours. Then, 2.13 g of triethylamine was added thereto to finish the reaction. The obtained crude product was subject to reprecipitation by 1 L methanol. A filtered polymer was dissolved in tetrahydrofuran and re-subject to reprecipitation by methanol. This was filtered and dried to obtain 18.8 g of a white polymer. This polymer was measured by $^1$H-NMR. As a result, it had a repeating unit represented by the following formula (V), and a ratio (molar ratio) of l:m:n:o was 13:31:43:13.

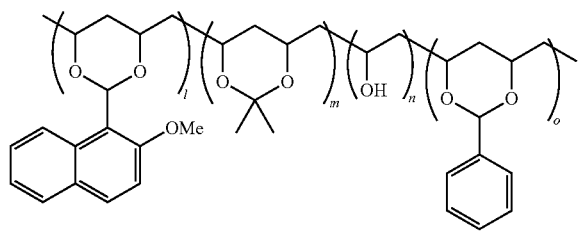

(V)

The obtained polymer was dissolved in methyl ethyl ketone (MEK), applied onto a polyethylene terephthalate film (thickness: 70 μm) using an applicator, dried in an air circulation type drying oven at 130° C. and thereafter peeled from the polyethylene terephthalate film to prepare a film having a thickness of 170 μm. This film was subjected to transverse uniaxial stretching at a stretching rate of 2.1 times by a stretching machine in an air circulation type drying oven at 130° C. to prepare a stretched film (retardation film) C. Properties of the obtained retardation film C are illustrated in Table 1.

Example 8

67.35 parts of cyclohexanedimethanol (hereinafter abbreviated as "CHDM"), 90.94 parts of 9,9-bis(4-hydroxy-3-methylphenyl)florene (hereinafter abbreviated as "BCF") and 154.61 parts of diphenylcarbonate, and $1.8 \times 10^{-2}$ parts of tetramethylammonium hydroxide and $1.6 \times 10^{-4}$ parts of sodium hydroxide each serving as catalyst were heated in a nitrogen atmosphere at 180° C. and melted. Then, the degree of reduced pressure was adjusted to 13.4 kPa over a period of 30 minutes. Then, the temperature was increased up to 260° C. at a rate of 60° C./hour, this temperature was maintained for 10 minutes, and then the degree of reduced pressure was adjusted to 133 Pa or lower over a period of 1 hour. The reaction was carried out with stirring for a total time period of 6 hours.

After completion of the reaction, dodecylbenzenesulfonic acid tetrabutylphosphonium salt in an amount 4 times the catalyst amount was added to deactivate the catalysts, then, a reaction product was discharged from the bottom of the reaction vessel under nitrogen pressure and cut with a pelletizer with cooling it in a water vessel to obtain pellets (copolycarbonate).

Subsequently, a T-die having a width of 150 mm and a lip width of 500 μm and a film take-up device were attached to a 15 mm φ biaxial extruder (produced by Technovel Co., Ltd.) to subject the obtained copolycarbonate to film-forming, thereby obtaining a transparent extruded film having a thickness of 120 μm. This film was subjected to transverse uniaxial stretching at a stretching rate of 2.1 times by a stretching machine in an air circulation type drying oven at 126° C. to prepare a stretched film (retardation film) D-1. Properties of the obtained retardation film D-1 are illustrated in Table 1.

Example 9

A stretched film (retardation film) D-2 was prepared in the same manner as that in Example 8, except that the thickness of the film before stretching, the stretching temperature, and the stretching ratio, were changed, respectively, to 160 μm, 118° C. and 2.4 times, instead of 120 μm, 126° C. and 2.1 times. Properties of the obtained retardation film D-2 are illustrated in Table 1.

Example 10

5.0 g of polyvinyl alcohol-based resin "NH-18" (trade name: produced by Nippon Synthetic Chemical Industry Co., Ltd. (polymerization degree=1800, saponification degree=99.0%)) was dried at 105° C. for 2 hours and thereafter dissolved in 95 mL dimethyl sulfoxide (DMSO). 2.02 g of 2,4,6-trimethylbenzaldehyde (mesitaldehyde) and 0.44 g of p-toluenesulfonate monohydrate were added thereto, and stirred at 40° C. for 2 hours. 13.41 g of 1,1-diethoxyethane (acetal) was added thereto, and the whole was stirred at 40° C. for 2 hour. Then, 1.18 g of triethylamine was added thereto to complete the reaction. The obtained reaction product (polymer) was dripped into a methanol solution to cause reprecipitation. This polymer was precipitated and a supernatant solution was removed by decantation. Then, methanol/water=1/1 (volume/volume) was added to wash the polymer. The polymer was subjected to filtering, and a resulting polymer was dried to obtain 7.50 g of a white polymer. As a result of measurement by $^1$H-NMR, the polymer was a polyvinyl acetal-based resin having a structure (l:m:n=21:58:21) represented by the following formula (VI).

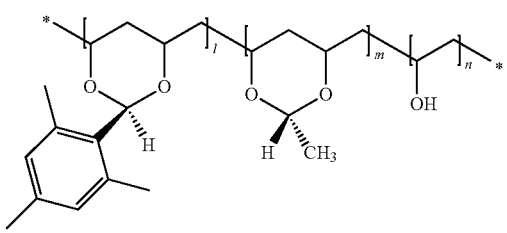

(VI)

The obtained polyvinyl acetal-based resin (17.7 weight parts) was dissolved in toluene (100 weight parts), and the resulting solution was uniformly applied onto a surface of a 75 μm-thick polyethylene terephthalate film (trade name "Lumirror S-27E" produced by Toray Industries, Inc.) using a comma coater and dried in an air circulation type drying oven with gradually increasing the drying temperature from a low temperature 80° C. for 20 min, 120° C. for 20 min and 140° C. for 30 min to obtain a film having a thickness of 160 μm. This film was subjected to transverse uniaxial stretching at a stretching rate of 2.1 times by a stretching machine in an air circulation type drying oven at 141° C. to prepare a stretched film (retardation film) E. Properties of the obtained retardation film E are illustrated in Table 1.

Comparative Example 1

A 130-thick μm cycloolefin-based resin "ARTON film FEKP130," (trade name; produced by JSR Corporation) was subjected to transverse uniaxial stretching at a stretching rate of 2.0 times by a stretching machine in an air circulation type drying oven at 147° C. to prepare a stretched film (retardation film) F. Properties of the obtained retardation film F are illustrated in Table 1.

Comparative Example 2

A stretched film (retardation film) G was prepared in the same manner as that in Example 1, except that the thickness of the film before stretching, the stretching temperature, and the stretching ratio, were changed, respectively, to 140 μm, 145° C. and 1.4 times, instead of 135 μm, 135° C. and 2.1 times. Properties of the obtained retardation film G are illustrated in Table 1.

Comparative Example 3

A stretched film (retardation film) H was prepared in the same manner as that in Example 1, except that the thickness of the film before stretching, the stretching temperature, and the stretching direction and the stretching ratio, were changed, respectively, to 100 μm, 130° C. and longitudinal uniaxial stretching at 2.0 times), instead of 135 μm, 135° C. and the transverse uniaxial stretching at 2.1 times. Properties of the obtained retardation film H are illustrated in Table 1.

A polycarbonate-based resin "Pureace WR (S)" (trade name; produced by TEIJIN Chemicals Ltd.) was dissolved in methylene chloride to form a solution. This solution was applied onto a PET, and dried at 130° C. to obtain a film having a thickness of 130 μm. This film was subjected to longitudinal uniaxial stretching at a stretching rate of 1.8 times by a stretching machine in an air circulation type drying oven at 150° C. to prepare a stretched film (retardation film) I. Properties of the obtained retardation film I are illustrated in Table 1.

Each of the retardation films obtained in Examples 1 to 10 and Comparative Examples 1 to 4 and a polarizing plate "NPF TEG1465DUHC" (trade name; produced by Nitto Denko Corporation) (layer thickness except any layer of adhesive agent: 112 μm) were laminated through an acrylic-based layer of adhesive agent (20 μm) in such a manner as to allow an angle between a slow axis of the retardation film and an absorption axis of the polarizing plate to become 45 degrees, thereby preparing a circularly polarizing plate. This circularly polarizing plate was laminated onto a viewing side of an organic EL panel "15EL9500" (trade name; produced by LG Display Co., Ltd.) through the same acrylic-based layer of adhesive agent (20 μm) to prepare a display panel device.

A reflection spectrum of the obtained display panel device was measured using a spectrophotometric colorimeter "CM-2600d" (trade name: produced by Konica Minolta Sensing, Inc.). The organic EL panel used for evaluation was used after an anti-reflection film laminated on a surface had been preliminarily removed. A result of the evaluation is illustrated in Table 1, and further in FIG. 3 for Example 1 and Comparative Examples 1 and 2. Further, as to the obtained display panel device, chromaticities (reflection hues) at 45 points on a display screen were measured using a spectrophotometric colorimeter "CM-2600d" (trade name: produced by Konica Minolta Sensing, Inc.). The measurement points were set, respectively, at centers of 45 areas defined by dividing the display screen equally vertically and horizontally into 5×9 pieces. Further, after the display panel device was stored in a constant-temperature oven at 85° C. for 96 hours (heating test), chromaticities at the 45 points on the display screen were measured in the same manner. Furthermore, uniformity of reflection color on the entire display screen was visually evaluated. The result is illustrated in Table 1, and further in FIG. 2 for Example 1 and Comparative Example 4 in the form of x, y chromaticity diagrams and photographs. In the x, y chromaticity diagrams illustrated in FIG. 4, chromaticities at the 45 points on the display screen are plotted as chromaticity coordinates (x,y), wherein a larger variation of the plots means a larger change in chromaticities within the display screen, which is undesirable as a display.

[Evaluation]

Figure 3:
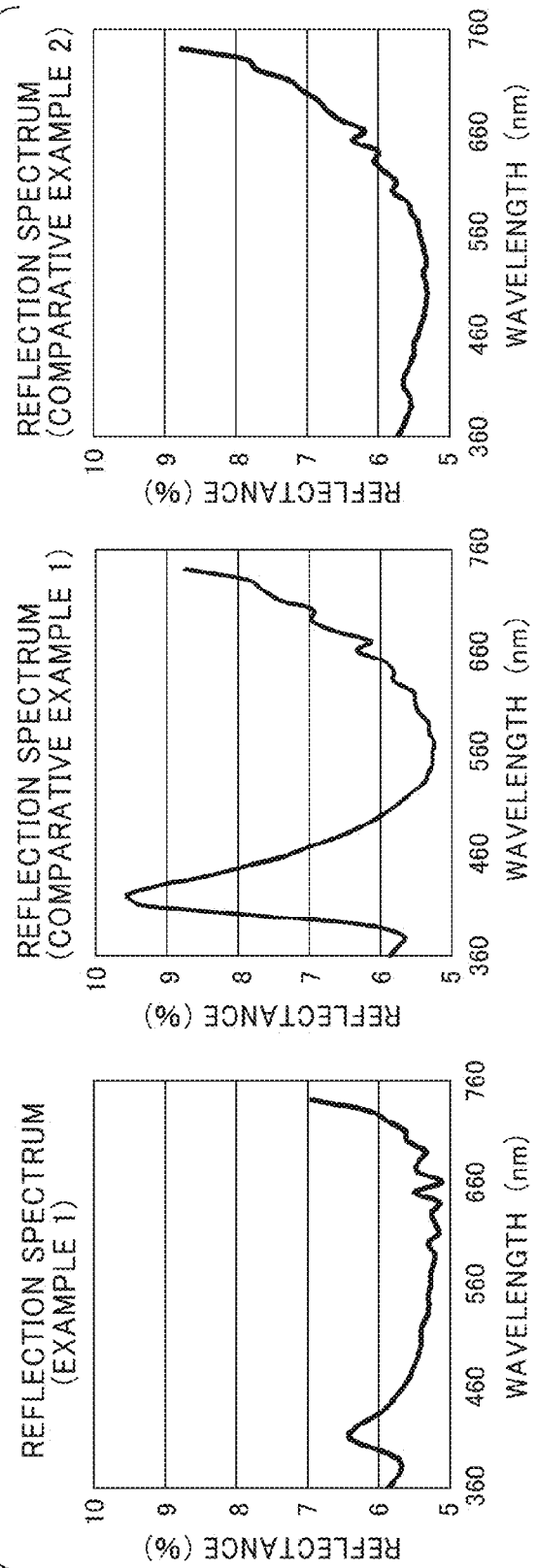
FIG. 3 is a graph illustrating a reflection spectrum of a display panel device comprising a polarizing plate using a retardation film obtained in each of Example 1, Comparative Example 1 and Comparative Example 2.

It was confirmed that, as illustrated in FIG. 3, in Example 1, reflection was suppressed over the entire visible light region and a visual reflection color was black, which showed that it had excellent properties as a retardation film for use in an anti-reflection circularly polarizing plate for displays.

The similar results were obtained in the remaining Examples 2 to 10. On the other hand, it was confirmed that, in Comparative Examples 1 and 2, reflections occurred largely on a shorter wavelength side and on a longer wavelength side, and the visual reflection color became blue or red, respectively, which showed that they were unsuitable as the circularly polarizing plates for use in the anti-reflection retardation film for displays.

It was confirmed that, as shown in Table, in each of Examples 1 to 10, a folding endurance of the retardation film was greater than 100 cycles in both of the MD and TD directions, whereas, in Comparative Examples 3 and 4, the folding endurance of the retardation film in the TD direction was significantly less than 100 cycles, which indicated brittleness of the film. Further, in each of Examples 1 to 9, the widthwise (width-direction) stretching ratio of the retardation film was 1.5 times or more, which provided a large widthwise effective utilization rate and thus a cost advantage was high, whereas, in Comparative Example 2, the widthwise stretching ratio was less than 1.5 times and thus a cost advantage was low.

Figure 4:
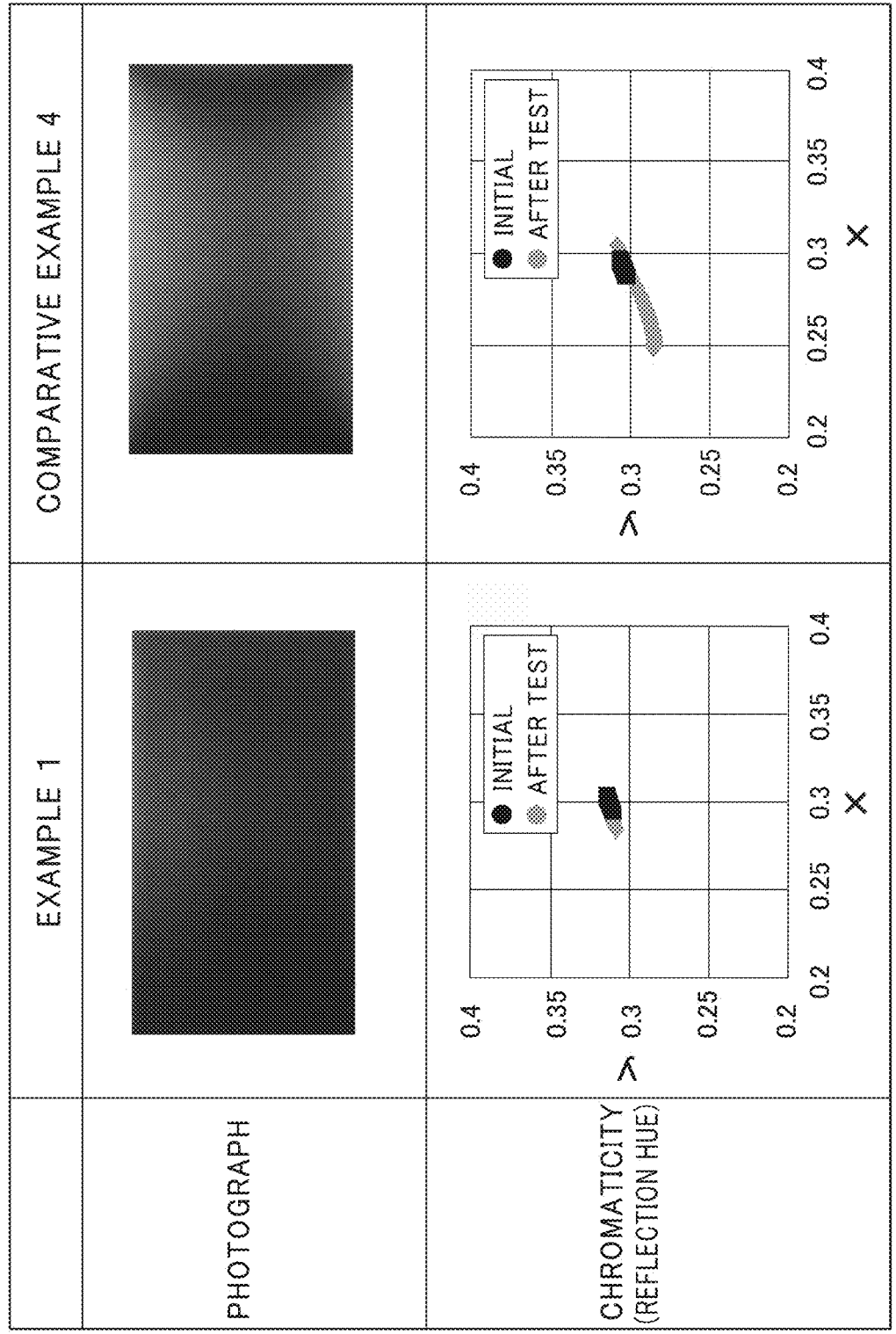
FIG. 4 is a photograph and a chromaticity diagram illustrating a heating test result of a display panel device comprising a polarizing plate using a retardation film obtained in each of Example 1 and Comparative Example 4.

As illustrated in FIG. 4, in Comparative Example 4, chromaticity during the heating test was largely changed between a neutral color around the chromaticity coordinate (x, y)=(0.3, 0.3) and a blue color in a region having small coordinate values. In contrast, in Example 1, a variation in the plots on the chromaticity coordinates (x, y) was small, and a change in chromaticities within the display screen was suppressed small. The similar results were obtained in the remaining Examples 2 to 10. Further, as illustrated in the photographs, in Comparative Examples 4, the reflection color became un-uniformed within the display screen due to heating, whereas, in Example 1, the reflection color within the display screen was maintained uniformly. The similar results were obtained in the remaining Examples 2 to 10. The above results showed that each of Examples 1 to 10 had excellent properties as the retardation film for use in the anti-reflection circularly polarizing plate for displays.

As above, although the present invention has been particularly shown and described with reference to specific embodiments thereof, it is to be understood that the scope of present invention is not limited to details of the illustrated embodiments, but should be determined by the appended claims and their legal equivalents.

EXPLANATION OF CODES

1: polarizer
2, 2': optional protective layer
3, 3': optical film
4: retardation film
11: polarizing plate
300: feeding section
310: aqueous iodine solution bath
320: bath of aqueous solution containing boric acid and potassium iodide
330: bath of aqueous solution containing potassium iodide
340: drying means
350: polarizer
360: take-up section

What is claimed is:

1. An anti-reflection circularly polarizing plate for an organic EL display, comprising:
   a polarizer; and
   a retardation film including a stretched polymer film and satisfying the following formulae (1) to (3):

$$0.70 < Re[450]/Re[550] < 0.97 \quad (1)$$

$$1.5 \times 10^{-3} < \Delta n < 6 \times 10^{-3} \quad (2)$$

$$1.13 < NZ < 1.50 \quad (3)$$

wherein Re[450] and Re[550] represent in-plane retardation values of the retardation film as measured at 23° C. using light with a wavelength of 450 nm and light with a wavelength of 550 nm, respectively; $\Delta n$ represents an in-plane birefringence equal to (nx−ny) (where nx and ny represent refractive indexes in a slow axis direction and a fast axis direction of the retardation film, respectively); and NZ represents a ratio of a thickness-direction birefringence equal to (nx−nz) (where nz represents a refractive index in a thickness direction of the retardation film) to the in-plane birefringence equal to (nx−ny)

wherein the stretched polymer film is made of an aliphatic polymer, and comprises a primary component consisting of a high molecular weight complex which comprises a main chain having a stretch-orientation property and, in a side chain, a unit having an absorption edge at a wavelength of 260 to 380 nm, wherein a plane of the side chain intersects with a direction along which the main chain extends.

2. The anti-reflection circularly polarizing plate for an organic EL display according to claim 1, wherein an absolute value (m$^2$/N) of a photoelastic coefficient of the retardation film as measured at 23° C. using light with a wavelength of 550 nm is $50 \times 10^{-12}$ or less.

3. The anti-reflection circularly polarizing plate for an organic EL display according to claim 1, wherein an absolute value (m$^2$/N) of a photoelastic coefficient of the retardation film as measured at 23° C. using light with a wavelength of 550 nm is in a range of $10 \times 10^{-12}$ to $45 \times 10^{-12}$.

4. An organic EL display comprising: the anti-reflection circularly polarizing plate for an organic EL display according to claim 1; and an organic EL panel, wherein the anti-reflection circularly polarizing plate is disposed on a viewing side of the organic EL panel.

* * * * *